United States Patent [19]

Orelup

[11] 4,009,008
[45] Feb. 22, 1977

[54] COLORED WATER IMMISCIBLE ORGANIC LIQUID

[75] Inventor: Richard B. Orelup, Upper Saddle River, N.J.

[73] Assignee: Morton-Norwich Products, Inc., Chicago, Ill.

[22] Filed: Nov. 18, 1974

[21] Appl. No.: 524,528

Related U.S. Application Data

[62] Division of Ser. No. 313,591, Dec. 8, 1972, Pat. No. 3,862,120.

[52] U.S. Cl. .................................. 44/59; 8/6; 208/12; 252/9; 252/50; 252/51; 252/51.5 R; 252/364; 252/408; 260/191; 260/576

[51] Int. Cl.² .................. C10L 1/10; C10L 1/22; D06P 1/08

[58] Field of Search .......... 44/59; 208/12; 252/408, 252/9, 50, 51, 51.5 R, 364; 8/6

[56] References Cited

UNITED STATES PATENTS

| | | | |
|---|---|---|---|
| 1,914,549 | 6/1933 | Woodward | 44/59 X |
| 1,986,116 | 1/1935 | Payne | 44/59 X |
| 2,059,094 | 10/1936 | Eistert et al. | 44/59 X |
| 2,925,333 | 2/1960 | Thompson | 44/59 |
| 3,004,821 | 10/1961 | Gano | 44/59 X |
| 3,049,532 | 8/1962 | Gaetani | 260/191 |
| 3,690,809 | 9/1972 | Orelup | 8/6 |
| 3,704,106 | 11/1972 | Orelup | 44/59 |

*Primary Examiner*—Floyd D. Higel
*Attorney, Agent, or Firm*—Jack Axelrood

[57] ABSTRACT

Novel disazo colorants or dyes for marking organic liquids, the colorants having the general formula

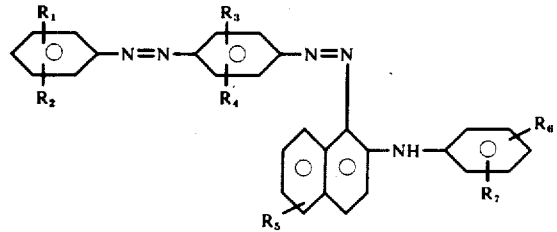

where
$R_1$ is H, $CF_3$, or alkyl having from 1 to 4 carbon atoms,
$R_2$ is H, or alkyl having from 1 to 4 carbon atoms,
$R_3$ and $R_4$ are each H, $OCH_3$, $OC_2H_5$ or $CH_3$, and
$R_5$, $R_6$ and $R_7$ are each H, or alkyl having from 1 to 12 carbon atoms, at least one of said $R_5$, $R_6$ and $R_7$ being alkyl.

The novel compound of the general formula

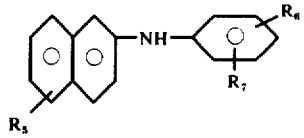

where $R_5$, $R_6$ and $R_7$ are as described above is provided and is useful as an intermediate in the preparation of said disazo colorants. Methods for the preparation of the colorants are disclosed together with qualitative and quantitative procedures for detecting these colorants in the marked liquids.

3 Claims, 3 Drawing Figures

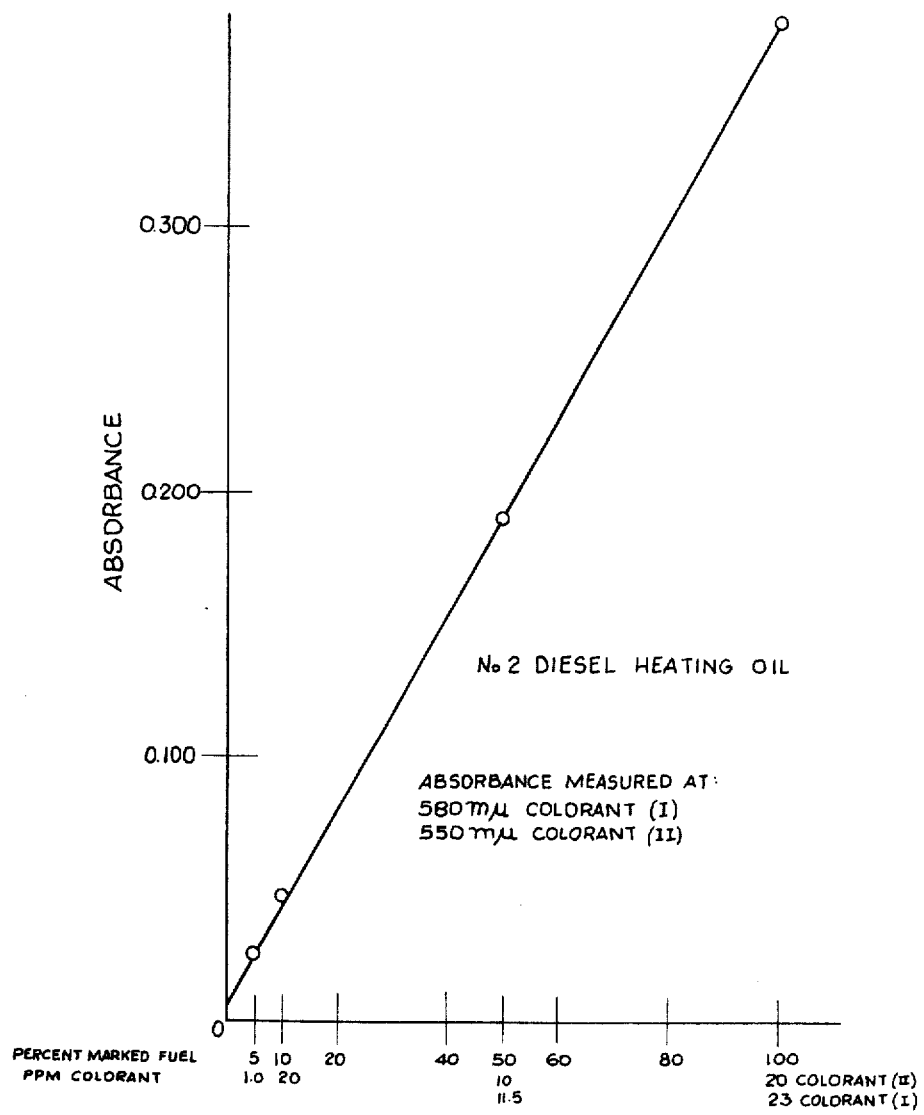

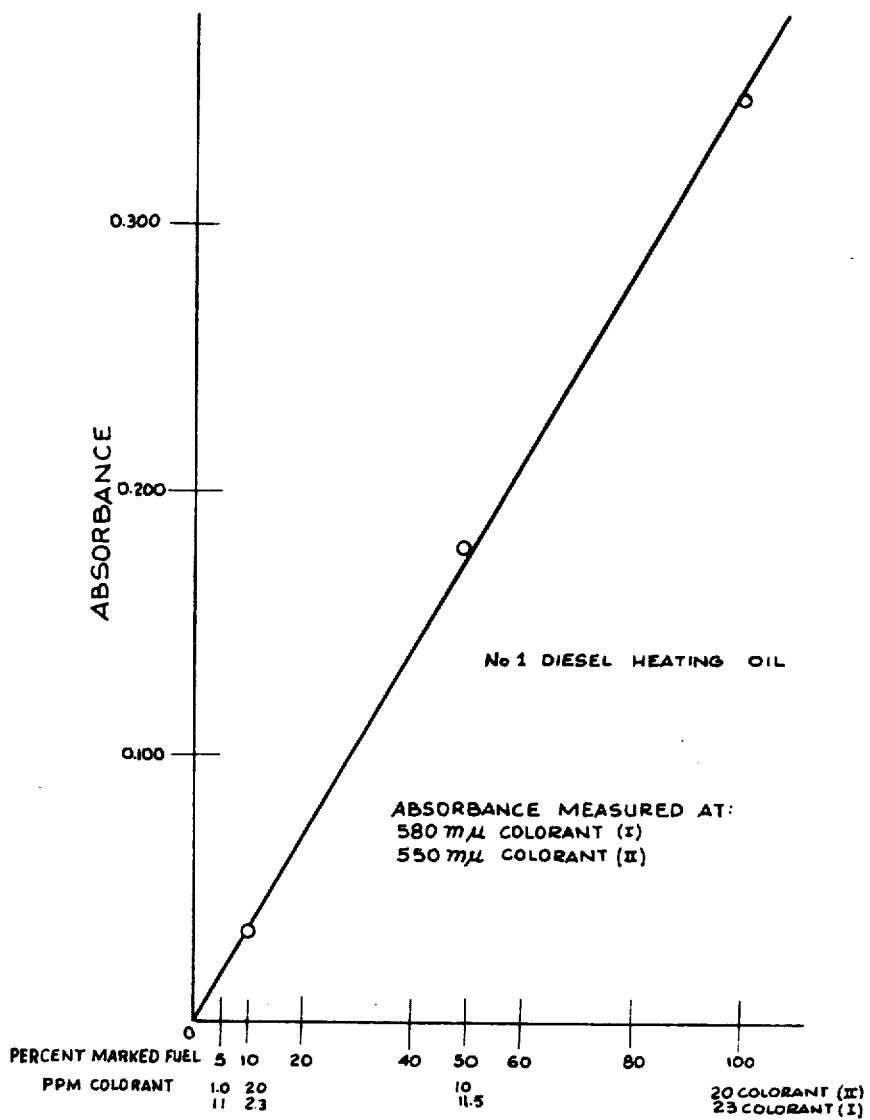

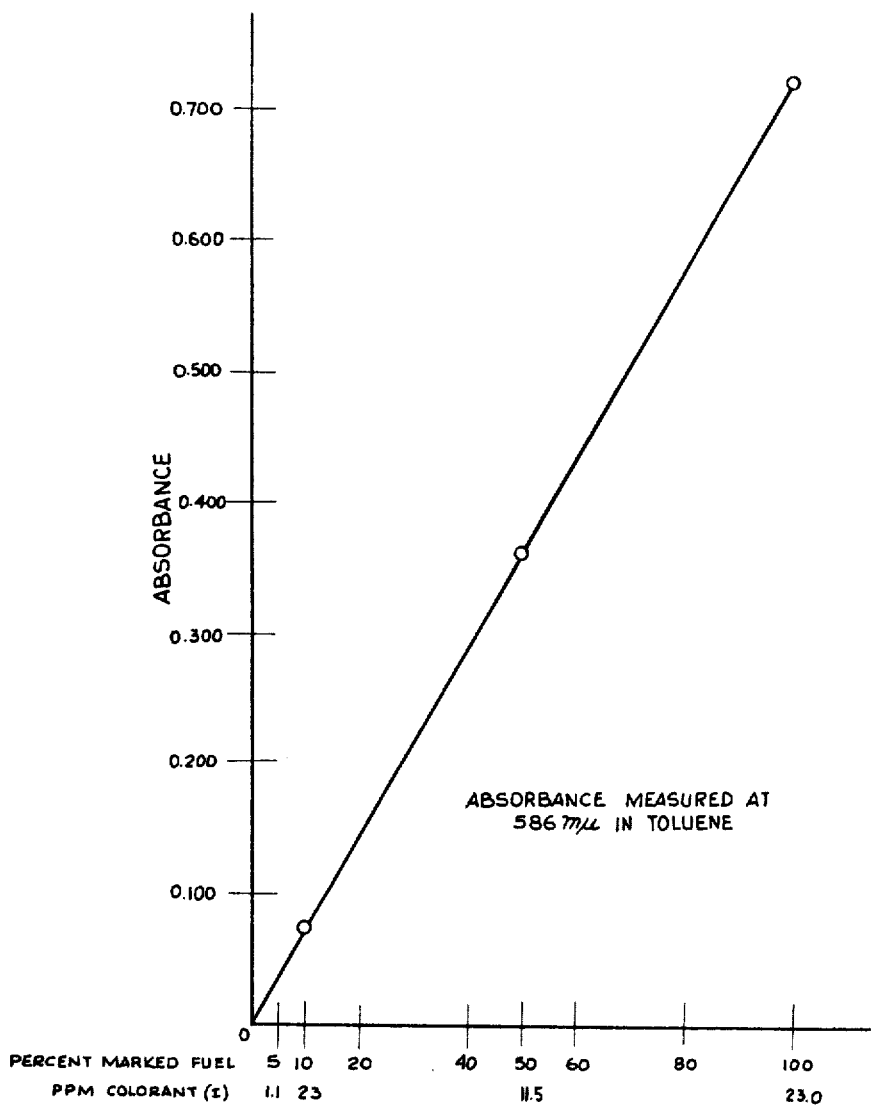

COLORED WATER IMMISCIBLE ORGANIC LIQUID

This is a division of application Ser. No. 313,591, filed Dec. 8, 1972, now U.S. Pat. No. 3,862,120, patented Jan. 21, 1975.

BACKGROUND OF THE INVENTION

1. Field of the Invention

Colorants or dyes suitable for coloring water immiscible organic liquids, particularly petroleum-derived products, are in general and widespread commercial use. There exists a particular need for coloring or marking petroleum-derived products and for means to identify positively the specific colorant or marking ingredient present, and to determine the concentration thereof.

This need arises primarily through the governmental regulatory action of foreign countries, including certain Provinces of Canada and many European countries, by which taxes are imposed on motive and heating fuels. The tax regulations of some countries (and of some States in the United States) provide that particular dyes and/or chemical markers must be added to taxable or non-taxable fuels, as the case may be, to provide a means for identification to prove or disprove the payment of taxes. For example, Manitoba Regulation 51/66 under the Motive Fuel Tax Act of Canada, provides the following at Paragraph 5 under the caption "Marked and Coloured Motive Fuel":

"Motive fuel used for any of the purposes mentioned in subsection (7) of Section 3 of the Act shall be given a specific colour and separate identity by means of a purple dye and a chemical marker, as may be determined by the minister."

It is, of course, necessary that the added dye and/or chemical marker be capable of quick and relatively simple identification by non-scientific personnel. In other instances, and aside from tax matters, there are occasions when it is desirable to mark a particular production batch of fuel or solvent to prove the origin of the material. These instances arise in questions of theft and pollution control. As is readily apparent, any colorant or marker so used must be added in small concentration, should not affect the physical or chemical properties of the substances to which it is added, and should be easily identified by relatively quick and simple means.

The tax laws of some countries, for example, certain Provinces in Canada, prescribe that diesel fuel to be sold for use in powering vehicles on the highway be colorless and bear a higher tax than heating oils which are required to be colored. This higher tax is an important factor in causing the price of diesel fuel to be considerably higher than that of heating oil. However, diesel fuels and heating oils of certain grades have very similar chemical compositions and are virtually indistinguishable in their physical properties. In fact, in many instances their identification as distinct entities defies ordinary chemical analysis.

The theory of providing particular classes of colored heating oils as opposed to non-colored diesel fuels is that visual inspection will serve to identify the non-taxed heating oil by its color and the highly taxed diesel fuel by its lack of color. Thus, a dealer in these commodities may have one tank containing colorless, high priced (and taxed) diesel fuel and another tank containing non-taxed, low-priced and colored heating oil. Unfortunately, this presents opportunities for unscrupulous individuals to evade lawful taxation. One way is to decolorize the low-priced, colored heating oil and then sell the colorless product as the higher priced diesel fuel. Some of the commercially available adsorbents which serve this purpose are carbon black, charcoal, and various clays, silicas and aluminas.

In those countries where the tax laws provide that a highly taxed motive fuel be dyed a specific color, as for example in Great Britain, another form of deception is to dilute the taxed, colored fuel with a colorless, non-taxed fuel of virtually the same composition.

Obviously, what is needed is a colorant or series of colorants which are not removed from petroleum products by the common adsorbents and which colorants may be easily identified and quantitatively determined to thwart the tax dodgers and prevent large-scale tax evasions.

DESCRIPTION OF THE PRIOR ART

The term "petroleum products" as used herein refers to such petroleum-derived products as gasoline, diesel oils, motive oils, heating or fuel oils, lubricating oils, kerosenes, jet fuels, and naphthas.

A variety of dyes or colorants is available for coloring petroleum products. Among the dyes currently or recently used are those sold under the trademarks Solvent Reds No. 19,23,24,25,26 and 27, Solvent Blue No. 36, Solvent Yellows No. 14 and No. 56, Calco Red Y, Automate Red B, DuPont Oil Red, Automate Yellow 8, DuPont Oil Orange, BASF Liquid Red P-36, BASF Liquid Red SG 7834, BASF Liquid Yellow, BASF Liquid Blue, Automate Blue No. 8, and Automate Orange R. However, these commercially available dyes suffer from the following disadvantages:

1. They are easily removed from petroleum products to which they are added by the common adsorbents such as clays, charcoal, carbon black and silica.

2. In the instance of diesel fuels which contain a variety of naturally occurring impurities including dispersed carbon black, unstable red, brown, and yellow color bodies, and fluorescent compounds, many of the current dyes simply disappear and cannot be recognized except at high concentrations.

3. Convenient "on-the-spot" qualitative tests for the identification of these dyes either do not exist or are relatively complex and time consuming.

4. Quantitative tests for determing the concentration of these dyes in the various petroleum products to which they are added either do not exist or are relatively protracted and cumbersome operations.

5. Some dyes, such as Solvent Red No. 23 and Solvent Red No. 24 impart yellowish tints making them rather ineffective for coloring yellowish to brown-colored diesel oil.

It would therefore be desirable to provide novel colorants for water immiscible organic liquids, particularly petroleum products, which colorants are highly resistant to removal by the common adsorbents and which colorants may be detected qualitatively by on-the-spot testing and which may be determined quantitatively by convenient laboratory methods.

Generally, it is an object of this invention to improve on the art of marking water immiscible organic liquids with a colorant and of identifying said colorant. More specifically, it is an object of the present invention to improve on the art of marking petroleum products with a colorant and identifying said colorant rapidly and efficiently in the presence of pre-existing natural coloring bodies and/or added dyes.

It is another object of this invention to provide novel colorants or dyes which are soluble in water immiscible organic liquids and are highly resistant to removal from solution therefrom by the adsorbents which are commonly used for extracting the present solvent dyes and/or natural coloring bodies.

Another object of the present invention is to provide a novel intermediate for the preparation of the novel colorants of this invention.

It is another object of this invention to provide a simple "on-the-spot" qualitative test for the rapid identification of said novel colorants.

It is a further object of the present invention to provide an efficient and relatively simple laboratory method for the identification of the novel colorants of this invention.

Another object of this invention is to provide an efficient laboratory method for the quantitative determination of the disazo colorants of this invention.

A still further object of this invention is to provide colored water immiscible organic liquids containing the novel colorants of the present invention, which colorants are highly resistant to removal from solution by the commonly used adsorbents.

The fulfillment of these and other related objects of this invention may be more readily appreciated by reference to the following specification, examples and appended claims.

SUMMARY OF THE INVENTION

The present invention provides novel disazo colorants or dyes for coloring water immiscible organic liquids, which colorants are highly resistant to removal from said organic liquids, said colorants having the general formula

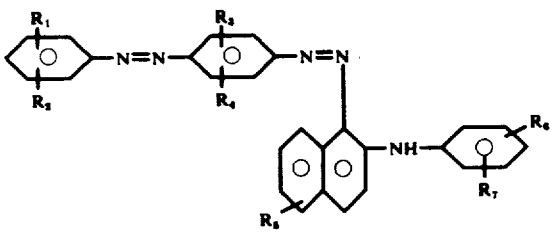

where
$R_1$ is H, $CF_3$, or alkyl having from 1 to 4 carbon atoms,
$R_2$ is H or alkyl having from 1 to 4 carbon atoms,
$R_3$ and $R_4$ are each H, $OCH_3$, $OC_2H_5$ or $CH_3$, and
$R_5$, $R_6$ and $R_7$ are each H or alkyl having from 1 to 12 carbon atoms, at least one of said $R_5$, $R_6$ and $R_7$ being alkyl.

One of the preferred disazo colorants of this invention is where $R_1$ is $CF_3$, $R_2$ is H, $R_3$ is $OCH_3$, $R_4$ is $CH_3$, $R_5$ is $C_7H_{15}$, $R_6$ is $C_{12}H_{25}$ and $R_7$ is H, according to the formula

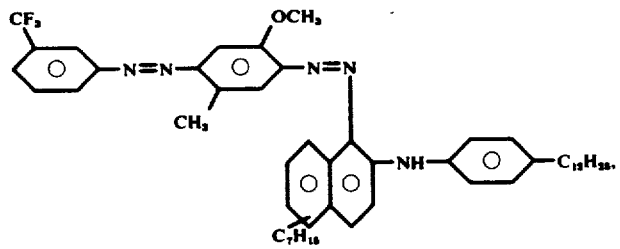

said colorant hereinafter being referred to as Colorant (I).

Another of the preferred disazo colorants comprises a mixture of compounds having the formula

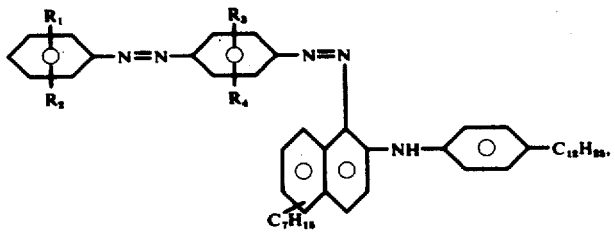

where $R_1$, $R_2$, $R_3$ and $R_4$ are each H or $CH_3$, said colorant hereinafter being referred to as Colorant (II).

Colorants (I) and (II) are conveniently provided as low viscosity liquids containing xylene.

The present invention also provides a novel intermediate for preparing the present disazo colorants, said intermediate having the general formula

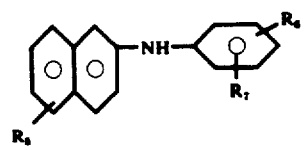

where $R_5$, $R_6$ and $R_7$ are each H or alkyl having from 1 to 12 carbon atoms, at least one of said $R_5$, $R_6$ and $R_7$ being alkyl.

The terms colorants, dyes and markers are used interchangeably herein.

In general, the disazo colorants of this invention may be prepared by a process which comprises (1) diazotizing a compound of the formula

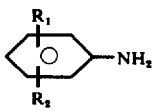

where $R_1$ is H, $CF_3$ or alkyl having from 1 to 4 carbon atoms and $R_2$ is H or alkyl having from 1 to 4 carbon atoms, (2) coupling said diazotized compound with a compound of the formula

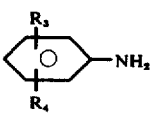

where $R_3$ and $R_4$ are each H, $OCH_3$, $OC_2H_5$ or $CH_3$, to form an aminoazo product, (3) diazotizing the aminoazo product so formed, and (4) coupling said diazotized aminoazo product with a compound of the formula

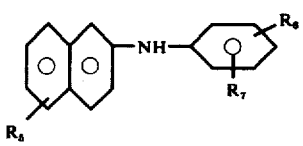

where $R_5$, $R_6$ and $R_7$ are each H or alkyl having from 1 to 12 carbon atoms, at least one of said $R_5$, $R_6$ and $R_7$ being alkyl.

As described in more detail in the following Examples, in the instance of the preparation of Colorant (I), m-aminobenzotrifluoride is diazotized and coupled to p-cresidine. The resultant aminoazo product is diazotized, and the diazotized product thereof is coupled to 2-(dodecylphenylamino) heptylnaphthalene to provide the product having the formula

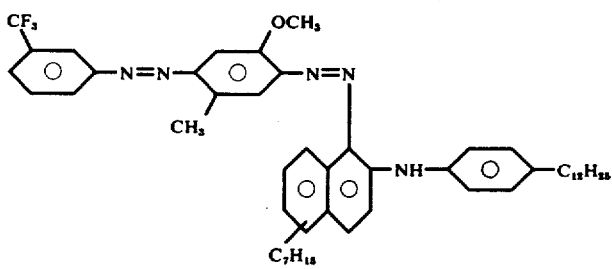

The intermediate of this invention,

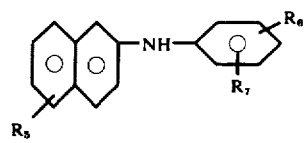

where $R_5$, $R_6$ and $R_7$ are each H or alkyl having from 1 to 12 carbon atoms, at least one of said $R_5$, $R_6$ and $R_7$ being alkyl, is prepared by a process which comprises condensing at a temperature of from about 185° to about 230° C. and in the presence of xylene, iodine and hydrochloric acid, a beta naphthol of the formula

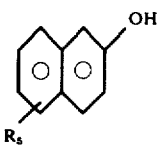

where $R_5$ is H or alkyl having from 1 to 12 carbon atoms with a substituted aniline of the formula

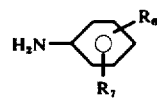

where $R_6$ and $R_7$ are each H or alkyl having from 1 to 12 carbon atoms, at least one of said $R_5$, $R_6$ and $R_7$ being alkyl, and cooling and washing the reacted mass to provide the desired product.

One of the preferred intermediates of this invention is where $R_5$ is $C_7H_{15}$, $R_6$ is $C_{12}H_{25}$ and $R_7$ is H.

The novel colorants of this invention display a surprisingly high solubility in virtually all water immiscible organic liquids such as paraffinic hydrocarbons, aromatic hydrocarbons, alkyl-aryl hydrocarbons such as alkyl benzenes and alkyl naphthalenes, petroleum products such as gasoline, kerosene, naphthas, diesel fuels, jet fuels, heating fuels, and lubricating oils, chlorinated solvents such as chloroform, ethylene dichloride, chlorobenzenes and perchloroethylene, alcohols, esters, ketones, and glycol ethers. This is in contrast to the currently available dyes which have relatively low solubilities in most water immiscilbe organic liquids, particularly in petroleum products such as gasoline, diesel fuels and heating oils. For example, a solubility in these products of 5% is considered extremely high, while most dyes have solubilities considerably lower than 2%. Colorants (I) and (II) hereof are significantly more soluble in aromatic and hydrocarbon solvents than are the current dyes now in use for coloring petroleum products. In fact, these two Colorants are soluble in all proportions in isooctane, gasoline and diesel oil. It is well known that isooctane is a very poor solvent for the conventional dyes.

A concentration of 20 parts per million of Colorant (II) was chosen to be added to a petroleum product to achieve a 100% marked, i.e., a fully marked product. This is on the basis that such concentration provides a color intensity comparable to that used by the various governments prescribing the use of dyes for coloring fuels for tax purposes. Due to the fact that the color intensity of Colorant (I) is slightly less than that of Colorant (II), a concentration of 23 parts per million of Colorant (I) in a petroleum product provides a 100% marked (or colored) product. A petroleum product found to contain only 2 parts per million of Colorant (II) would therefore be a 10% marked product and would indicate that one part of the originally 100% marked product had been diluted with 9 parts of a non-marked but similar petroleum product.

Another and perhaps most important attribute of the present disazo colorants is their relative chemical inertness and resistance to adsorption from petroleum products in which they are dissolved. This attribute makes it possible by means of the common adsorbents to separate out other conventional dyes and/or naturally occurring color bodies, leaving the disazo colorants of this invention in solution where they may be identified and their concentration determined quantitatively. Qualitative identification by a rapid on-the-spot procedure enables tax officials to determine quickly the existence of the added disazo colorant and therefore the likelihood of tax evasion. A quantitative determination of the concentration of disazo colorant in a suspected petroleum product provides proof of the degree of dilution by prohibited diluents.

A visual on-the-spot field test for the presence in a petroleum product of one of the disazo colorants of this invention is provided by the following procedure:

A convenient sample of the colored fuel (50 to 100 ml.) is shaken vigorously with 1 or 2 grams of an adsorbent such as a clay, or preferably a hydrated silica commercially available under the trademark HI-SIL No. 233. The mixture is allowed to settle to form a clear upper layer and a sediment, whereupon the color of the clear fuel becomes visible while the conventional added dyes or color bodies naturally present in the fuel are removed by the adsorbent. The characteristic color of the disazo colorant is evident in the clear layer.

By this simple qualitative test, it is possible to detect the color of the disazo colorant even where the 100% marked fuel has been diluted to a 5% marked product. In the instance where the petroleum product is gasoline, the same procedure is followed except that the adsorbent is preferably silica gel.

To determine the quantity of disazo colorant present in the marked fuel, the same procedure as for the qualitative test is followed except that the clear layer is separated from the sediment by filtration. The absorbance of the filtrate is measured spectrophotometrically at a wave length which depends upon the specific colorant used. Thus, for example, a wave length of 550 m$\mu$ is used if the colorant is Colorant (II), or 580–590 m$\mu$ if the colorant is Colorant (I). The absorbance obtained from the marked sample is compared with the previously determined absorbances at various concentrations of the particular colorant in question. It has been determined, as set forth in the Examples hereinafter described, that a straight line graph is obtained when the absorbances of Colorants (I) and (II) are each plotted against their respective concentrations.

An alternate quantitative procedure for the determination of the quantity of disazo colorant present in gasoline comprises percolating a measured sample of the colored gasoline through a column of highly activated alumina to deposit all color bodies present thereon. The column is then washed with isooctane which removes any residual gasoline, followed by toluene which preferentially dissolves the colorants of the present invention leaving the conventional dyes and naturally occurring color bodies on the column. The absorbance of the toluene solution is measured and compared, as before, with the previously determined absorbances of the colorant in question to determine the concentration of disazo colorant.

A more detailed laboratory identification test for the presence in gasoline of the disazo dyes of the present invention is provided by the use of Thin Layer Chromatography (TLC). A portion of the toluene solution of the colorant obtained by passage of the colored gasoline through a column of activated alumina is concentrated and spotted on a standard Merck Silica Gel coated glass plate along with a standard spot of the particular colorant in question. The color and $R_f$ values obtained for the test specimen are compared with that of the standard known Colorant to establish the identity of the colorant in the gasoline. It was established by using standard Merck Silica Gel coated glass plates and toluene as the eluent that the $R_f$ values for Colorant (I) are 0.88 at 10 cm. and 0.83 at 17 cm., and those for Colorant (II) are 0.86 at 10 cm. and 0.81 at 17 cm. These values are much higher than those for the conventional petroleum product dyes which generally range from about a low of 0.22 to a high of 0.74 with most values lying in the range of from 0.22 to about 0.59. The unusually high $R_f$ values for the present disazo colorants serve as another means for positive identification of these dyes.

Thin Layer Chromatography may also be employed on the benzene solution of colorant removed from colored diesel fuel by means of a highly acid-activated clay known commercially as Impact No. 150. It is reiterated that the present disazo colorants are highly resistant to removal from solution by the ordinary adsorbents in common use. However, an unusually active acid-activated clay such as Impact No. 150, or a highly activated alumina will remove even the disazo colorants of this invention from solution.

The invention will now be illustrated by a number of examples, it being understood, however, that these examples are given by way of illustration and not by way of limitation, and that many changes and alterations may be effected in quantity, choice of raw material and process conditions in general without affecting in any way the scope and spirit of the invention as recited in the appended claims.

DESCRIPTION OF THE PREFERRED EMBODIMENTS

EXAMPLE 1

Preparation of the Disazo Colorant

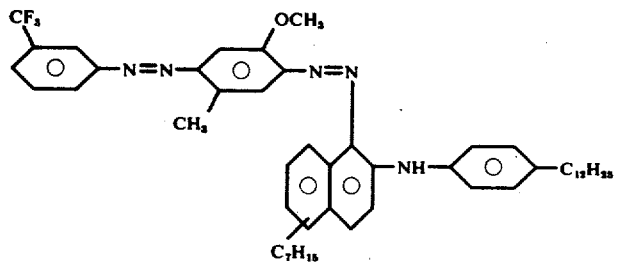

A slurry was formed containing 0.20 gram mol of m-aminobenzotrifluoride in 300 ml. water containing a dispersing agent known commercially as Sotex N. To this slurry 0.50 mol of HCl was added slowly with stirring to form the amine hydrochloride and to give a fine dispersion thereof. The amine hydrochloride was diazotized with the approximately theoretical quantity of sodium nitrite required, at a temperature of about 0° C. in the presence of about 300 g. of ice to yield a turbid brownish solution. A solution was prepared containing 0.20 gram mol of p-cresidine in 200 ml. water, 0.22 mol HCl and 4 drops of Sotex N. Ice was added to this solution to maintain it at about 0° C. To this solution, the diazotized amine was quickly added with maximum stirring to effect coupling thereof with the p-cresidine.

The coupled product was diazotized by raising the temperature thereof to about 15° C. and adding 0.20 mol of sodium nitrite thereto in small portions. The temperature of this diazotized product was then cooled to about 10° C. after which 0.2 mol of the reactant 2-(dodecylphenylamino) heptylnaphthalene was added to effect coupling therewith and provide the final product in the reaction mixture. The reaction mixture was warmed and water separated therefrom to provide the final product.

EXAMPLE 2

Preparation of the Disazo Colorant comprising a mixture of compounds having the general formula:

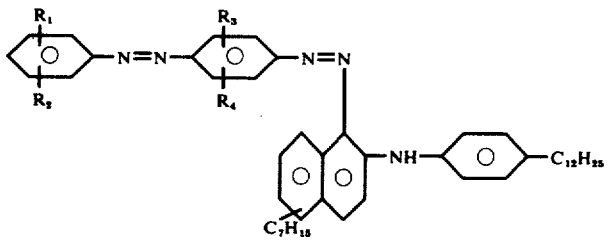

where $R_1$, $R_2$, $R_3$ and $R_4$ are each H or $CH_3$.

A mixture of aniline, toluidine and mixed xylidines was partially diazotized in the presence of insufficient aqueous HCl with the result that the diazo compounds formed coupled with the excess aniline, toluidine and mixed xylidene to form mixed amino azo compounds. The mixed amino azo compounds were diazotized in the usual fashion. This diazotized mixture was added to a solution containing the coupling component 2-(dodecylphenylamino) heptylnaphthalene in a molar quantity substantially equal to the number of moles of mixed amino azo compounds employed to form the desired product.

EXAMPLES 3 – 7

The procedure of Example 2 was repeated except that the final coupling component was varied as indicated in the following table to yield the indicated disazo colorant:

Table 1

In each of the following dyes, $R_1$, $R_2$, $R_3$ and $R_4$ are each H or $CH_3$.

| Ex. | Coupling Component | Disazo Colorant |
|---|---|---|
| 3 | 2-(dodecylphenylamino)-naphthalene | (structure shown) |

Table 1-continued

In each of the following dyes, $R_1$, $R_2$, $R_3$ and $R_4$ are each H or $CH_3$.

| Ex. | Coupling Component | Disazo Colorant |
|---|---|---|
| 4 | 2-(phenylamino)heptylnaphthalene | |
| 5 | 2-(butylphenylamino)heptylnaphthalene | |
| 6 | 2-(dimethylphenylamino) | |
| 7 | 2-(phenylamino)dodecylnaphthalene | |

Detection of Disazo Colorants in Petroleum Products

EXAMPLE 8

Detection of Disazo Colorant in Diesel Heating Oil

Twenty-three parts per million of a disazo colorant having the formula

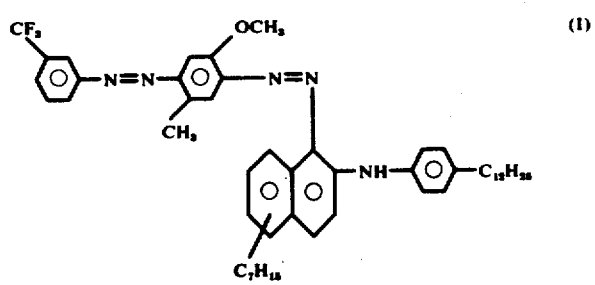

(I)

were added to a diesel heating fuel having a natural yellow-brownish color to provide a fully marked (100%) deeply colored solution. One hundred milliliters of the colored fuel were shaken vigorously with 1 gram of a hydrated silica commercially available under the trademark Hi-Sil No. 233. The mixture was allowed to settle to form a clear upper layer of fuel and a lower sediment layer. The clear fuel displayed the characteristic bluish color of the disazo colorant. The clear colored fuel may be decanted into a test tube to a depth of 4–5 inches and the upper surface (meniscus) viewed by transmitted or reflected light, or the total depth may be viewed axially to detect the characteristic tint of the added colorant. In this manner, as little as 5% of marked fuel diluted with 95% of unmarked fuel (equivalent to a colorant concentration of about 1 ppm) may be detected.

The above procedure was repeated except that the disazo colorant employed was a mixture of compounds embraced by the formula:

TABLE 3-continued

| PPM Colorant (I) | PPM Colorant (II) | % Marked Fuel | Observed Absorbance |
|---|---|---|---|
| 2.3 | 2 | 10 | 0.034 |
| 1.1 | 1 | 5 | 0.019 |
| 0 | 0 | 0 | 0 |

These values are depicted graphically in FIG. 2 in which the observed absorbances are plotted along the ordinate and the percent marked fuel (parts per million of disazo colorant) is plotted along the abscissa.

For comparative purposes, the same No. 1 diesel oil was colored with the dye (Solvent Red No. 24) currently in use in France and the United Kingdom (and proposed in Germany) for tinting petroleum fuels in concentrations as prescribed by the laws of these countries and carried through the same procedure as set forth in Example 10. Solvent Red No. 23 is currently in use in Italy. These concentrations for a 100% marked fuel are 10 ppm for France, 5 ppm proposed for Germany, 4 ppm for the United Kingdom and 30 ppm for Italy. In addition, a 10% marked fuel was prepared for each diesel fuel. The absorbances for each of these solutions were compared with those set forth in the graph in FIG. 2 to determine the dye content of the respective solutions remaining after treatment with the Hi-Sil No. 233 decolorizing agent. The results were as follows:

| | % Dye Remaining | |
|---|---|---|
| | 100% Marked Fuel | 10% Marked Fuel |
| France | 54 | 5 |
| Germany | 34 | 2 |
| United Kingdom | 19 | 1 |
| Italy | 37.8 | 4.4 |

This illustrates that the current dyes used in the indicated countries are fairly easily removed by an adsorbent which has little or no effect on the present disazo colorants.

EXAMPLE 12

Quantitative Determination of Disazo Colorant in Gasoline

Twenty-three parts per million of Colorant (I) were added to gasoline to provide a fully marked (100%) product. Fifty milliliters of the marked gasoline were diluted with an equal volume of isooctane (hexane is also suitable) and percolated through a 10 gram column of activated alumina. An excellent chromatographic column for this purpose is 25 × 10.5 mm with integral 200 ml reservoir, and lower Teflon plug stopcock. A fresh highly active chromatographic grade of alumina is required, at least the equal of that commercially available under the trademark Alcoa F-20 (80 – 200 mesh). The principal problem here is to ensure complete retention of marker dye on the column. Other gasoline dyes and additives are strongly adsorbed near the very top of the column.

After passage of fuel mixture the marker dye is visible as a blue-black band or zone, perhaps somewhat diffused, in the upper half of the column. At low marked fuel concentrations the marker may be poorly visible, or obscured by other colorants, and is not necessarily confined totally to the visible area.

The column was then given an isooctane wash to dislodge adhering gasoline, and thereafter toluene was passed therethrough. The marker dye was observed to concentrate sharply at the toluene front and move down the column. Collection of eluent in a 25 ml. volumetric was begun shortly before dye arrived at the bottom and continued well past the point at which no more color is visible. Almost all marker was collected in approximately 10 ml. eluent, but up to 25 ml. may be collected to ensure no loss.

The collected eluent was diluted to 25 ml. and the absorbance was measured at a wave length of 586 mμ. Absorbance of toluene is zero at these wave lengths, and impurities or other gasoline dyes are retained on the column. Therefore the absorbance reading can be directly related to marker dye concentration, allowing for the proportion of initial sample volume to 25 ml. eluent.

The above procedure was repeated with the following concentrations of Colorant (I) present in the gasoline:

| PPM | % Marked Gasoline |
|---|---|
| 11.5 | 50 |
| 2.3 | 10 |
| 0 (Blank) | 0 |

In addition, 4 more samples of gasoline colored in the same manner and at the same concentrations were carried through this procedure to give a total of 5 different sets of absorbances. The average of the absorbances for each concentration were determined and are set forth in Table 4.

Table 4

| PPM | % Marked Gasoline | Observed Absorbance |
|---|---|---|
| 23 | 100 | 0.722 |
| 11.5 | 50 | 0.362 |
| 2.3 | 10 | 0.075 |
| 0 | 0 | 0 |

These values are depicted graphically in FIG. 3 in which the observed absorbances are plotted along the ordinate and the percent marked fuel (parts per million of Colorant I) is plotted along the abscissa.

Comparing the absorbances plotted in FIG. 3 with known standard solutions of Colorant (I) at 100 and 10% marked fuel levels, it was found that there was only a 4% color loss at the 100% marked fuel level and no apparent loss at the 10% level.

EXAMPLE 13

Identification of Disazo Colorant - Thin Layer Chromatographic Procedure

Diesel Heating Oil

Diesel heating fuel was marked with 23 parts per million of Colorant (I). One-hundred milliliters of the

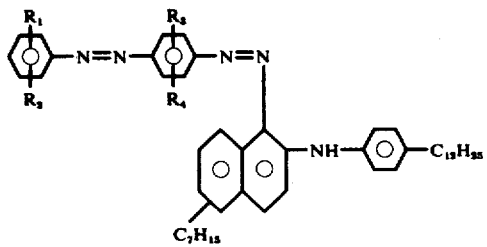

(II)

where $R_1$, $R_2$, $R_3$, and $R_4$ are each H or $CH_3$, and the concentration of said colorant in the fuel was 20 parts per million. The characteristic reddish tint of this colorant was detected in the clear fuel layer.

This example demonstrate the removal of naturally-occurring color bodies by a common adsorbent and resistance of the present disazo colorants to adsorption by said adsorbent.

EXAMPLE 9

Detection of Disazo Colorant in Gasoline

Colorant (I) was added to gasoline at a concentration of 23 parts per million (100% marked fuel) to provide a tinted fuel. It is understood that the gasoline may have a purple color if red colored gasoline was used, or a dark murky color if the gasoline was colored with the conventional orange and yellow dyes. One hundred milliliters of the tinted fuel were shaken vigorously with 20 grams of silica gel. The mixture was allowed to settle to form a clear upper layer and a lower sediment layer. The clear layer displayed the characteristic blue color of Colorant (I).

The above procedure was repeated except that Colorant (II) was employed. The characteristic bluish-red tint of Colorant (II) was observed in the clear fuel layer.

EXAMPLE 10

Quantitative Determination of Disazo Colorant in No. 2 Diesel Heating Oil

Colorant (I) was added at a concentration of twenty-three parts per million to a dark No. 2 diesel-heating fuel to provide a fully marked (100%) fuel. Fifty milliliters of the marked fuel were shaken with 2.5 grams of Hi-Sil No. 233 and allowed to settle. The tinted fuel was separated by filtration and its absorbance was measured spectrophotometrically at a wave length of 580 m$\mu$.

The above procedure was repeated except that the following concentrations of Colorant (I) were employed:

| PPM | % Marked Fuel |
|---|---|
| 11.5 | 50 |
| 2.3 | 10 |
| 1.1 | 5 |

| PPM | % Marked Fuel |
|---|---|
| 0 | 0 |

The above procedure was repeated on 9 additional No. 2 diesel heating oils containing the same concentrations of Colorant (I) to give a total of 10 different sets of absorbance values. The averages of the absorbances for each concentration were determined and are set forth in the following table (Table 2).

TABLE 2

| PPM | % Marked Fuel | Observed Absorbance |
|---|---|---|
| 23 | 100 | 0.373 |
| 11.5 | 50 | 0.190 |
| 2.3 | 10 | 0.045 |
| 1.1 | 5 | 0.026 |
| 0 | 0 | 0.007 |

Colorant (II) was carried through the same procedure as that for Colorant (I) employing the following concentrations.

| PPM | % Marked Fuel |
|---|---|
| 20 | 100 |
| 10 | 50 |
| 2 | 10 |
| 1 | 5 |

The absorbances were determined at a wave length of 550 m$\mu$, and were found to be the same as for Colorant (I).

The foregoing values are depicted graphically in FIG. 1 in which the observed absorbance is plotted along the ordinate and the percent marked fuel (parts per million of disazo colorant) is plotted along the abscissa.

By reference to the graph of FIG. 1, it is possible for an analyst to measure the absorbance of an unknown diesel fuel according to the procedure set forth in this Example and determine the quantity (parts per million) of disazo colorant present in the unknown fuel. Thus, for example, if it were determined that 11.5 parts per million of Colorant (I) were present in the fuel, it would follow that the fuel had been diluted with an equal volume of unmarked (non-colored) fuel with the result that the fuel is now only 50% marked, or 50% diluted.

The foregoing demonstrates that the method of this Example provides an efficient, rapid and accurate method for identifying and quantitatively determining the disazo colorants present in petroleum products even where such products contain other naturally occurring or added color bodies.

EXAMPLE 11

The procedure of Example 10 was repeated except that seven different No. 1 diesel oils were used. The individual absorbances were averaged and are set forth in Table 3.

TABLE 3

| PPM | | % Marked Fuel | Observed Absorbance |
|---|---|---|---|
| Colorant (I) | Colorant (II) | | |
| 23 | 20 | 100 | 0.348 |
| 11.5 | 10 | 50 | 0.178 | marked fuel were shaken thoroughly with 6 grams of an acid activated bentonite clay commercially available under the trademark Impact No. 150 until the fuel was decolorized. The clay was filtered, washed free of oil with isooctane, and sucked fairly dry. It is not advisable to suck more than minimum air through the cake because the color value of adsorbed impurities will substantially increase in the presence of air and the low pH clay. Colorant (I) and some impurities were then removed from the clay by a careful wash with benzene (about 5 – 10 ml), and the eluent concentrated by steam bath or hot plate, either down to an appropriate concentration or nearly to dryness and redissolved in 1–2 ml benzene. The choice of concentration will be dictated by the amount of color visible in the initial eluent which may be considerable or virtually invisible in the presence of accompanying impurities.

One to five microliters of the benzene solution were spotted on a standard Merck Silica Gel coated glass plate, along with a standard spot of Colorant (I), and the chromatogram was developed with toluene. The color of both spots was found to be a characteristic blue-black shade.

The $R_f$ values of Colorant (I) from said diesel heating fuel were determined at 10 and 17 centimeters respectively and were found to be 0.88 and 0.83 respectively, which is in close agreement with those of a standard spot of Colorant (I).

In view of the many sensitive variables associated with $R_f$ values in the thin layer chromatography technique, it is always advisable to run an accompanying standard spot rather than to rely on a fixed $R_f$ value for any particular dye. However, the following table (Table 5) indicates $R_f$ values obtained for typical dyes which are in current use for coloring gasoline and might be present in any particular brand of gasoline. These are relative rather than absolute values.

The $R_f$ values were obtained by spotting 1 microliter of 50 mg dye/10 ml. of a xylene solution on Merck plates, 1 cm above the bottom. Values were determined for 10 and 17 cm solvent front travel with the former (approximately 20 minutes development time) giving the best distinction.

TABLE 5

| DYE | 10 cm | 17 cm |
| --- | --- | --- |
| Colorant (I) | 0.88 | 0.83 |
| Colorant (II) | 0.86 | 0.81 |
| Commercial Designation | | |
| Red TAX | 0.27 | 0.34 |
| Calco Red Y | 0.40 | 0.46 |
| Orange TX | 0.30 | 0.39 |
| Automate Red B | 0.38 | 0.39 |
| DuPont Oil Red | 0.33 | 0.32 |
| Automate Yellow No. 8 | 0.74 | 0.73 |
| Red AB4 | 0.28 | 0.32 |
| Purple A | 0.39 | 0.35 |
| Automate Orange R | 0.47 | 0.42 |
| Automate Blue No. 8 | 0.33 | 0.30 |
| Orange 27 | 0.59 | 0.54 |
| DuPont Oil Orange | 0.31 | 0.29 |
| Solvent Yellow No. 56 | 0.43 | 0.39 |
| Solvent Blue No. 36 | 0.10 | 0.09 |
| BASF Liquid Red P-36 | 0.63 | |
| BASF Liquid Red SF7834 | 0.22 | |
| BASF Liquid Yellow | 0.59 | |
| BASF Liquid Blue | 0.33 | |

It is observed that only the dye known as Automate Yellow No. 8 has an $R_f$ value which approaches that of the present disazo colorants. However, the color shade of Automate Yellow No. 8 is markedly different from that of the present disazo colorants, and therefore completely distinguishable on that basis alone.

EXAMPLE 14

Identification of Disazo Colorant - Thin Layer Chromatography Gasoline

Colorant (I) was added to gasoline and was separated by the same procedure as described in Example 12, i.e., by a column of activated alumina. A portion of the toluene solution of Colorant (I) dissolved from the alumina was subjected to the same TLC procedure as described in Example 13 to yield the same characteristic blue-black spot and the same $R_f$ value as before.

EXAMPLE 15

Preparation of 2-(dodecylphenylamino) heptylnaphthalene

The following are charged to a 1 liter flask equipped with stirrer, reflux condenser and water trap:

| | |
| --- | --- |
| p-dodecylaniline | 1.0 mol. |
| heptyl beta naphthol | 1.1 mol. |
| xylene | 60 g. |
| iodine | 2 g. |
| HCl (32% Be) | 5 g. |

The mixture is heated as rapidly as possible to reflux temperature. Free water from the HCl is evolved gradually up to 205° C. where refluxing begins. The reaction proceeds at a temperature of about 214° C. and then slowly rises to 225°–230° C. to completion of the reaction. The completion of the reaction is signified by the cessation of water evolution, or its reduction to a preselected arbitrary low level. The mass is then cooled to about 105° C. and washed with a 45% KOH solution, washed until neutral and then dried.

What is claimed is:

1. A colored water immiscible organic liquid having dissolved therein a disazo colorant corresponding to the formula

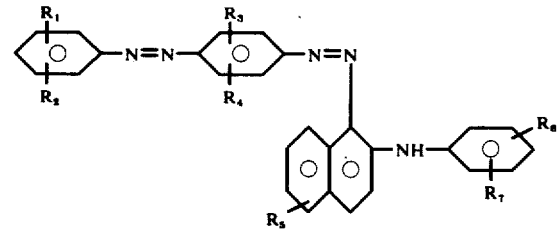

in which $R_1$ is H, $CF_3$, or alkyl having from 1 to 4 carbon atoms, $R_2$ is H or alkyl having from 1 to 4 carbon atoms, $R_3$ and $R_4$ are each H, $OCH_3$, $OC_2H_5$ or $CH_3$ and $R_5$, $R_6$ and $R_7$ are each H or alkyl having 1 to 12 carbon atoms, at least one of said $R_5$, $R_6$ and $R_7$ being alkyl, said disazo colorant being highly resistant to removal from said organic liquid by the commonly used adsorbents such as carbon black, charcoal, clay and silica.

2. The colored water immiscible organic liquid of Claim 1 wherein $R_1$ is $CF_3$, $R_2$ is H, $R_3$ is $OCH_3$, $R_4$ is $CH_3$, $R_5$ is $C_7H_{15}$, $R_6$ is $C_{12}H_{25}$, and $R_7$ is H.

3. A colored water immiscible organic liquid having dissolved therein a disazo colorant comprising a mixture of compounds having the formula

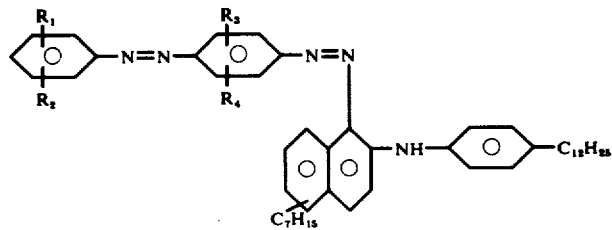
where $R_1$, $R_2$, $R_3$ and $R_4$ are each H or $CH_3$, said disazo colorant being highly resistant to removal from said organic liquid by the commonly used adsorbents such as carbon black, charcoal, clay and silica.
* * * * *